350-332 SR

XR 3,765,011

United States Patent

Sawyer et al.

3,765,011

Oct. 9, 1973

[54] FLAT PANEL IMAGE DISPLAY

[75] Inventors: Samuel P. Sawyer; Alan Sobel, both of Evanston, Ill.

[73] Assignee: Zenith Radio Corporation, Chicago, Ill.

[22] Filed: June 10, 1971

[21] Appl. No.: 151,636

[52] U.S. Cl.... 340/324 M, 178/7.3 D, 315/169 TV, 340/166 EL, 350/160 LC

[51] Int. Cl. ............................................ G08b 5/36

[58] Field of Search .................... 340/324 R, 166 R, 340/166 EL, 324 M; 178/7.3 D; 315/169 R, 169 TV; 350/160 LC; 40/52 R

[56] References Cited

UNITED STATES PATENTS

| | | | |
|---|---|---|---|
| 3,311,781 | 3/1967 | Duinker et al. | 315/169 TV |
| 3,564,135 | 2/1971 | Weimer | 178/7.3 D |
| 3,609,747 | 9/1971 | Ngo | 340/324 M |
| 3,532,813 | 10/1970 | Lechner | 315/169 R X |
| 3,627,924 | 12/1971 | Fleming et al. | 315/169 TV X |
| 3,041,490 | 6/1962 | Rajchman et al. | 315/169 TV X |
| 3,645,604 | 2/1972 | Ngo | 40/52 R X |
| 3,379,831 | 4/1968 | Hashimoto | 340/324 R X |
| 3,654,606 | 4/1972 | Marlowe et al. | 350/160 LC X |

*Primary Examiner*—David L. Trafton
*Attorney*—John J. Pederson and John H. Coult

[57] ABSTRACT

A plurality of display elements such as light generators or modulators are distributed over an image-display panel in horizontal rows and vertical columns. Each element is capable of displaying light in proportion to its level of energization. One side of each of the elements is returned to a conductive coating or the like that serves as a plane of reference potential. A like plurality of capacitors are individually associated with the respective display elements. Each of those capacitors has one terminal coupled to the other side of its corresponding display element. A plurality of breakdown-type switches are individually associated with the respective display elements and each switch has one terminal coupled to a point between the associated capacitor and the display element. In response to column-selection signals, the columns of switches and capacitors are selectively addressed to store respective instantaneous levels of the video signals. At the same time, the rows of display elements and switches are selectively addressed in a manner that first permits such storage and then effects delivery of the stored energy to the display elements.

12 Claims, 12 Drawing Figures

3765011
OR IN 340/324M

Inventors
Samuel P. Sawyer
Alan Sobel
By
Attorney

Inventors
Samuel P. Sawyer
Alan Sobel
By
Attorney

Inventors
Samuel P. Sawyer
Alan Sobel
By
Attorney

FLAT PANEL IMAGE DISPLAY

CROSS-REFERENCE TO RELATED APPLICATION

This application is related, but in no way dependent upon, a co-pending application, Ser. No. 135,954, filed Apr. 21, 1971, in the name of Allen Sobel, now U.S. Pat. No. 3,714,374, assigned to the assignee of the present invention.

The present invention pertains to image-display panels. More particularly, it relates to image-display panels for use in television systems and the like.

Since at least as early as the cathode-ray tube, much effort has been devoted to the ultimate objective of a flat image display panel. Flat-panel display devices have included matrices of such devices as electroluminescent cells, mechanical shutters, orientable particles suspended in a medium, radiation-emitting diodes, gas cells and liquid crystals.

Most prior flat-panel displays have employed a matrix of crossed conductors. The application of a potential between a given vertical conductor (a "column conductor") and a given horizontal conductor (a "row conductor") results in actuation of a light-display element situated at the crossing of those two conductors. In order to insure against even partial energization of display element located elsewhere along either one of the row and column conductors, each display element is associated with a selection device that typically takes the form of a series diode having a non-linear characteristic. A selecting potential biases the diode to approximately the knee of its characteristic and the video modulating voltage raises the applied potential beyond the knee of that curve.

For addressing such prior panels, numerous different sources have been suggested. These include the use of commutators, shift registers, traveling-wave pulses, and similar techniques. However, the degree of success obtained has been substantially less than that required, for example, in the case of displaying conventional television pictures.

Copending application Ser. No. 135,954, filed Apr. 21, 1971, now U.S. Pat. No. 3,714,374 and assigned to the same assignee as the present application, discloses a new and improved image-display panel that offers advantages relative to the aforesaid prior panels of the same general nature. In the image-display panel of that application, picture-element selection is achieved in a manner fully coordinated with picture element modulation, and with common components within the panel serving both functions. That panel employs a plurality of two-terminal breakdown-type switches that are coupled individually in series with respective light-display elements distributed over the panel in a matrix defining horizontal rows and vertical columns. Different columns of the switches are selectively addressed with pulses that, in conjunction with row-selection pulses, fire the switches. At the same time, the different columns are also addressed with video-representative modulating pulses that correspond individually to the instantaneous level of the picture information. Finally, different rows are addressed in a manner that supplies the voltage needed for firing, in conjunction with the column firing pulses, and completes respective return circuits for the firing pulses and the modulating pulses.

In some image-display applications, it is desirable to address the display a row at a time. The information corresponding to each picture element in the row is stored in a storage device. When all the storage devices have been filled, they are simultaneously connected to the columns of the matrix, while a connection to a single row of the matrix determines the particular row that will be addressed by these signals. Each element in the row then receives a signal proportional to the output which it is to produce. This kind of operation has been termed line-by-line or line-at-a-time or parallel addressing.

In other types of panels, it is desirable to provide actuating power to all elements of the display for as long a time as is feasible. It is usually convenient to address such displays a line at a time, performing this addressing operation during a relatively short interval, and using the rest of the time to supply the actuating power. This mode of operation also requires the peripheral storage elements required for line-at-a-time operation, and in addition, means to provide the actuating signal during the time that addressing is not going on.

It is a general object of the present invention to provide a new and improved image-display panel that offers advantages relative to prior panels of the same general nature.

A more specific object of the present invention is to provide a new and improved image-display panel which is well adapted to line-at-a-time addressing.

Still another object of the present invention is to provide a new and improved image-display panel of the kind related to those disclosed in the aforesaid prior application but in which the requirements upon the switching elements are relaxed.

An image-display panel in accordance with the present invention includes a plurality of image-display elements distributed over the panel in a matrix of rows and columns. Each of those elements displays light in proportion to its level of energization. Included within the panel are means for returning all of the display elements to a plane of reference potential. Associated with the panel are means for supplying a video signal and row- and column-selection signals. A plurality of energy-accumulation elements are individually coupled to an associated display element. Similarly, a like plurality of breakdown-type switches are individually coupled to a corresponding display element. The different columns of the accumulation elements and switches are addressed in response to the column-selection signals and the video signal in order to effect storage in the different accumulation elements of respective instantaneous levels of the video signal. A single row of accumulation elements is simultaneously addressed to select the particular row of elements to be affected by the column signals.

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

Figure 1:
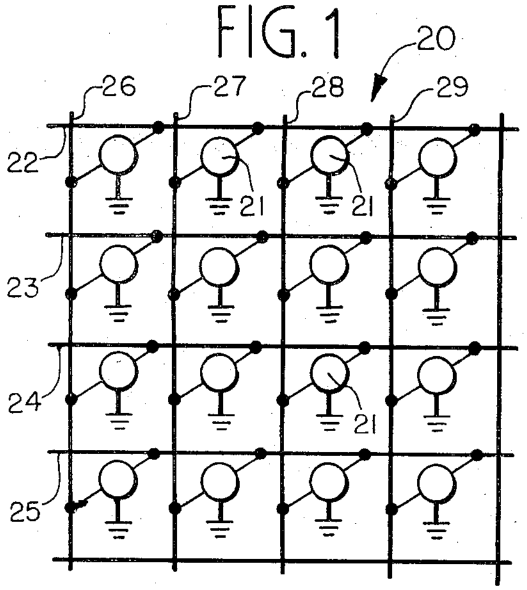
FIG. 1 is a schematic diagram of an image-display matrix.

A fundamental matrix 20 for an image-display panel is illustrated in FIG. 1. A plurality of light-display elements 21 are distributed over the panel so as to define horizontal rows 22, 23, 24 and 25 and vertical columns 26, 27, 28 and 29. These rows and columns in this case are further defined by corresponding crossed arrays of electrical conductors. Individual terminals of each display element 21 are connected between the respective horizontal and vertical conductors that cross at the approximate location of the display element. A third terminal of each display element 21 is returned to a plane of reference potential indicated in the drawings as ground.

Ignoring for the moment the ground connections in FIG. 1, matrix 20 could represent a matrix in which each element 21 is a source that emits light when a potential exceeding a certain threshold value is impressed across its terminals. Thus, the display element 21 located at the intersection or crossing of row conductor 22 and column conductor 28 would emit light when a potential of sufficient amplitude is impressed across those two conductors. By leaving one side of the potential source connected to row conductor 22 but commutating the other side of the source sequentially from one vertical conductor to the next, a horizontal line of picture elements 21 are successively energized. If the source connection to row conductor 22 is then switched to row conductor 23, and the other source connection again commutated across the vertical conductors, a second line of display elements 21 are successively energized. In this manner, a conventional television-like image raster may be developed by applying the instantaneous video or picture information to the different vertical conductors as they are scanned or commutated. Each different display element 21 represents a fundamental picture element of the overall image being reproduced. In conventional terminology, one complete scanning interval, during which all rows are successively scanned throughout their lengths, is defined as an image frame. Successive frames are likewise scanned within sufficiently short time intervals that the eyes of the observer integrate the different frames into a continuous picture capable of reproducing moving images.

Of course, in a complete image-display panel, it is necessary to include a system for addressing the many different display elements in order to select those desired at any instant and to control the selected display elements so that they emit light of the desired intensity. Some of the particularly different display elements available, especially those that respond to unidirectional energization, exhibit long persistence in response to a single short energy pulse delivered during a fraction of a frame interval. Nematic liquid crystals and certain direct-current-operated particle light modulators fall in that category. Other display devices, such as alternating-current-operated electroluminescent phosphors, require excitation for a substantial portion of the time period, usually the frame interval, during which they are required to produce light. Consequently, different addressing techniques, or at least appropriate modifications in the characteristics of the addressing signals, are necessary with respect to different kinds of display elements.

In addition, the particular arrangement of the addressing system is depending on whether the elements in a given row are addressed point-by-point or all at the same time. In the discussion above of one possible mode of operation of matrix 20, the addressing system for that point-by-point approach must select between the different columns of the light-display elements in such a manner that it basically constitutes a commutator both for selecting the different display elements and also for modulating the selected elements with video-signal information. In a row-by-row approach, a similar commutator may be employed to distribute the input video information to a bank of external storage elements, and at some subsequent time the contents of the storage elements are simultaneously "dumped" into the respective columns. When it is observed that a typical television display requires approximately 500 display elements in each row and about the same number of rows, and further a tri-color display panel may require three times that number of display elements, it is evident that the addressing system themselves become very complicated. Suggested approaches to the formation of such addressing systems include the use of large-scale monolithic integrated circuits and arrays of thin-film transistors. In the description which follows, attention will be given primarily to such row-by-row scanning.

In one known approach for operation of a fundamental matrix which may be represented as in FIG. 1, each of display elements 21, in themselves or by virtue of assocation with a separate device, exhibits a non-linear response characteristic featuring a pronounced knee. The selecting potential applied between the horizontal and vertical conductors is of a value corresponding approximately to the knee of the characteristic curve. The simultaneous superimposition of the video-representative control signal raises the energization of the display element above the knee in an amount which is proportional to the instantaneous video level. Correspondingly, the intensity of the light displayed is proportional to the level of energization beyond the threshold value of the knee. Consequently, each display element has properties which permit both selection and control, the function of selection determining whether a given display element displays any light and the function of control effecting a brightness which corresponds to the video information for that picture element.

Display elements 21 may be any suitable light-generating or light-controlling device. Injection-luminescent diodes, electroluminescent cells, and plasma cells exemplify light producers. Alternatively, the display elements may be either controllably reflective or controllably transmissive devices such as liquid crystals, mechanical shutters and polarization shutters. Some of these different devices operate best under energization by an alternating potential while others desirably are energized with a unidirectional potential. In any event, the kind of device to be employed in the apparatus hereinafter described is one that displays light with an intensity that is proportional to its level of energization. Also, each of the light-display elements includes an associated energy-storage device. With certain types of devices, such as electroluminescent cells and liquid crystals, the display element itself exhibits sufficient capacitance to serve as the energy-storage device. Where necessary, however, the storage function may be augmented or performed entirely by a separate but combined capacitive element. For the description which follows, it is to be understood that display elements 21 in FIG. 1 both display light and include an energy storage device in the nature of a capacitor. Further, and as will be described in detail, each of display elements 21 additionally is associated with an energy-accumulation element which may also be a capacitor, and with a breakdown-type switch.

Figure 2:
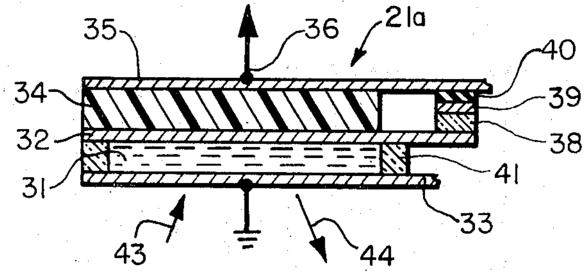
FIG. 2 is a cross-sectional view of a switch, accumulation element and light-display element for use at each picture-element point in the matrix of FIG. 1.

A particular construction of light-display element is shown for illustrative purposes in FIG. 2, which depicts a light-display element 21*a* composed of nematic liquid crystal material 31 sandwiched between a pair of electrodes 32 and 33. Electrode 33 is transparent, while electrode 32 preferably is highly reflective on its surface facing liquid crystal material 31. An energy-accumulation element 34 is similarly sandwiched between electrode 32 and an additional electrode 35. Accumulator 34 is a material which exhibits dielectric constant so as, together with electrodes 32 and 35, to constitute a capacitor. The dielectric properties of liquid crystal material 31 are such that it similarly constitutes an energy-storage device in the form of a capacitor electrically in parallel with the light-controlling function of liquid crystal material itself.

Preferably, the value of capacitance presented by accumulation element 34 is substantially greater than the value of capacitance presented by liquid crystal material 31. By virtue of the contiguous position of the different components in the structure of FIG. 2, it will be observed that liquid crystal material 31 is connected electrically in series with accumulation element 34 between a plane of reference potential or ground and an energizing terminal 36.

Also electrically connected to one edge of electrode 32, and hence connected to the junction between liquid crystal material 31 and accumulation element 34, is one side of a solid-state two-terminal breakdown-type ovonic switch 38. The other side of switch 38 is connected to another energizing terminal 39. More particularly, switch 38 is composed of a body of amorphous semiconductor material sandwiched between a conductive pair of electrodes or terminal connections.

In FIG. 2, display element 21a operates in a reflection mode as a light modulator. When nematic liquid crystal material 31 is energized by applying a unidirectional field across electrodes 32 and 33, light, represented by an arrow 43, approaching material 31 through transparent electrode 33, is scattered by the liquid crystal material so as to be directed backward as indicated by arrow 44. This effect has been termed "dynamic scattering," because scattering centers are produced in the transparent anisotropic medium of the liquid crystal material due to the disruptive effects of ions in transit. In typical practice, the liquid crystal material is sandwiched between electrodes spaced apart by the order of one-fourth mil. When no electric field is applied, the liquid crystal material is essentially transparent. With back electrode 32 being specularly reflecting and faced into a black background, the liquid crystal material appears to be black. However, when a potential, typically between 5 and 50 volts, is applied between electrodes 32 and 33, the liquid becomes turbid and scatters light. In that state, the liquid crystal material appears white. Increasing the field results in an increase of brightness so that a gray scale is obtainable. Contrast rations in excess of twenty to one have been obtained. The bulk of the incoming radiation is scattered in the direction of incident light travel; consequently, back electrode 32 desirably is highly reflecting so as to redirect that radiation back through the scattering medium in order to maximize the effect. A detailed discussion of liquid crystal theory, device construction, and material formulation will be found in an article entitled "Dynamic Scattering, A New Electro-Optic Effect in Certain Cases of Nematic Liquid Crystals" by George H. Heilmeier, et al., which appeared in *Proceedings of the IEEE*, Vol. 56, No. 7, July, 1968, pp. 1162–1171, as well as in references cited in the bibliography at the end of that article.

Ovonic switch 38 is of a kind described in an article by George Sideris entitled "Transistors Face an Invisible Foe," and which appeared in *Electronics*, pp. 191–195, Sept. 19, 1966. They also are described in an article entitled "Amorphous-Semi-conductor Switching" by H. K. Henisch which appeared at pp. 30–41 of *Scientific American* for September, 1969.

Each ovonic switch throughout the display matrix may simply be a small layer or dot of a glass-like material deposited upon an electrode of the associated light-display element, such as electrode 32 in FIG. 2. Differences in material constituents or in thickness permit the ovonic switches to exhibit different threshold levels, the threshold voltage apparently being a function of the energy band-gap of the material. In combination with the capacitance of the associated light-display element 31, the switches exhibit bi-stability in the sense that, once fired, each switch continues to pass current to the associated display element until the current is interrupted or until it falls below a critical value.

Figure 3:
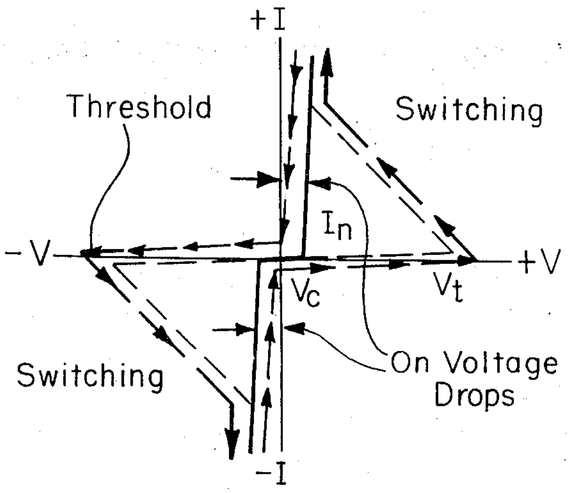
FIG. 3 is a plot of the operating characteristic of a switch employed in such a display matrix.

The characteristics of the ovonic switch or ovon are shown in FIG. 3. The switch presents a high resistance for voltages below a threshold level Vhd t. When that voltage across a switch is exceeded, the switch breaks down and conducts at a substantially constant voltage $V_c$; when conducting, the switch exhibits a low impedance. When the current through the switch falls below a holding current $I_h$, the switch reverts to its high-impedance state; this occurs when the voltage across the switch falls below the lesser level $V_c$. The switching action is independent of the polarity of the applied voltage, and switching in both directions is rapid.

Figure 4:
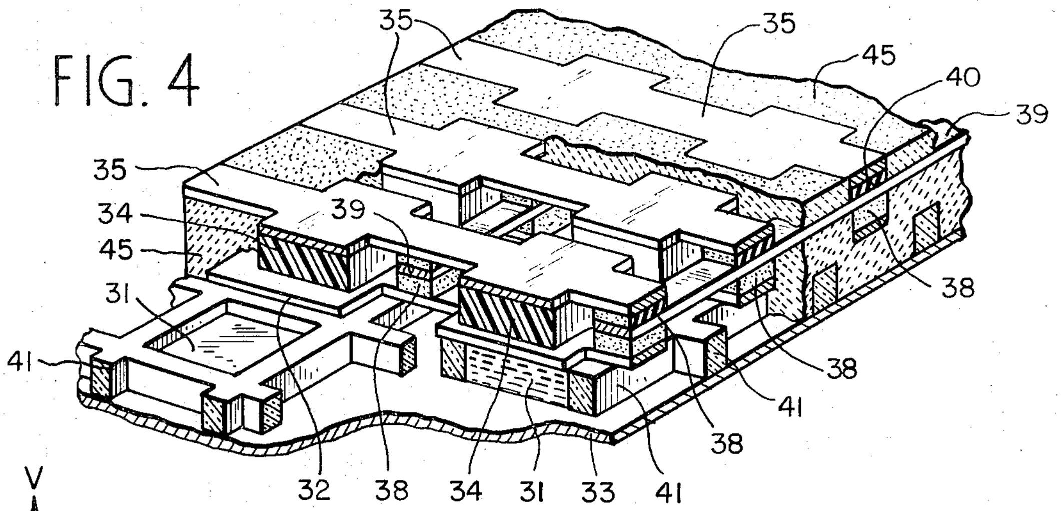
FIG. 4 is a fragmentary cross-sectional view of a plurality of light-display elements and their associated other components distributed in a display matrix.

FIG. 4 depicts a portion of the matrix of FIG. 1 as actually fabricated to include a plurality of display elements 21*a* of FIG. 2. Thus, each display element includes the centrally located electrode 32 disposed between a liquid-crystal display element 31 and a capacitive energy-accumulation element 34. FIG. 4 further represents a portion of one row of the elements within the panel, so that the electrode 35 on one side of all of the accumulation elements 34 also constitutes the corresponding horizontal conductor 23 of FIG. 1. Similarly, vertical or column conductors 26, 27 and 28 of FIG. 1 are shown in FIG. 4 as conductive strips electrically connected respectively to corresponding switches 38. Transparent electrode 33, which is connected to ground is forned as a film covering the entire lower face of the panel as a result of which it is in electrical contact with all of the liquid crystal elements 31. The row and column conductors 35 and 39 are separated at each cross point by spacers 40 (e.g., thin layers) of low dielectric constant material such as aluminum oxide. Liquid crystal elements 31 may be contained in individual compartments of a matrix or grid 41 of glass or the like. Finally, the interior spaces of the panel between the different components are filled with an insulator 45 which may desirably be black to provide optimum contrast. Of course, each row conductor in the panel is connected to the appropriate energizing terminal 36, while each column conductor is connected to a separate energizing terminal corresponding to terminal 39, in FIG. 2.

Figure 5:
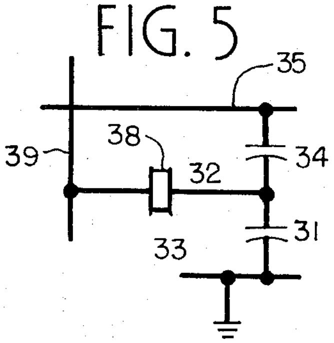
FIG. 5 is a schematic diagram of a fundamental picture element circuit.

FIG. 5 illustrates a fundamental single-element circuit for selecting and controlling a display element 31 of the class, such as nematic liquid crystals, that respond to direct current and exhibit a high impedance which comprises parallel resistance and capacitance components. For such a display element to scatter or othtewise control light, it is necessary that current flow through its included resistance. Moreover, the capacitance of display element 31 may itself store sufficient charge to provide the required current for a substantial fraction of an image frame interval.

As already noted, energy-accumulation element 34 is connected electrically in series between display element 31 and a row conductor 23. Similarly, switch 38 is electrically connected between a vertical conductor 26 and display element 31. Thus, FIG. 5 represents the control and energizing circuit for a single one of the display elements within the display panel of FIG. 4, and in this case FIG. 5 particularly represents the display element located near the junction of horizontal conductor 23 and vertical conductor 26.

The overall mode of operation is that of first storing video-representative energy in accumulation element 34 and then later delivering or dumping that energy into display element 31 so that the latter may display light. In order, then, to select display element 31 in FIG. 5 for subsequent display, a firing pulse is applied between conductors 23 and 26. This firing pulse has an amplitude sufficiently in excess of the threshold voltage $V_t$ to effect conduction of switch 38. The firing pulse is immediately followed by the production of a video-representative modulating or control pulse also applied between conductors 23 and 26. The modulating or control pulse charges accumulation element 34 to a control level which represents the instantaneous amplitude of the picture information. In actuality, a portion of the delivered energy also is stored in the capacitance of display element 31, but the provision of a separate capacitance element 34 in accordance with the invention permits the amount of energy storage in element 31 to be kept small while th discharge time constant may be longer than if the only capacitance were that of light-display element 31.

Figure 6:
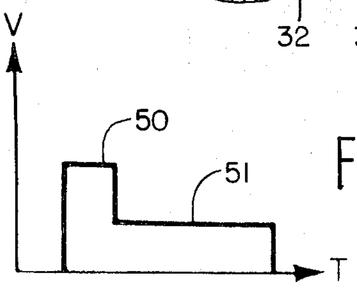
FIG. 6 is a plot of a firing and addressing pulse for application of the circuit of FIG. 5.

FIG. 6 shows an illustrative combined firing and control pulse. Thus, switch 38 breaks down upon the application of a comparatively short firing pulse 50 which is immediately followed by a lower-amplitude but longer-duration modulating or control pulse 51.

At or subsequent to the termination of control pulse 51, row electrode 23 is connected to the plane of reference potential or ground. This places accumulation element 34 directly in parallel with display element 31 as the result of which the substantial quantity of charge stored in accumulation element 34 is discharged through display element 31, effecting activation of the latter to perform its light display function. Typically, the capacitance of element 34 may be one hundred times that of element 31. Consequently, the time constant for discharge of the energy stored in accomulation element 34 may be correspondingly larger than the discharge time constant of a circuit in which the capacitance of the light-display element is the only charge-storage component. Of course, the discharge time constant is the product of the capacitance of the two elements connected in parallel and the leakage resistance of display element 31 paralleled by the resistance of switch 38 in its high-resistance "off" state. In a typical case, the leakage resistance of display element 31 may be $10^9$ ohms for a liquid crystal element while the "off" resistance of an ovonic switch may be of the order of $10^7$ ohms. Thus, the long time constant of the discharge cycle permits display element 31 to exhibit a large value of persistence, or time that it remains in its "on" condition. This is true even though the "off" resistance presented by switch 38 may not be extremely high.

In practice, it is preferred that firing pulse 50 and control pulse 51 be applied in the form of a potential of one polarity to a column electrode 26 simultaneously with the application of a potential of the other polarity to a corresponding row conductor 23; that is, the column can be said to have been driven up and the row driven down. In some versions, such as those utlizing direct-current-energized particle light modulators that may experience some difficulty with a degree of paralysis due to duch occurrences as electrophoresis, it may be desirable to reverse those relative polarities on each successive frame. It also may be noted that the arrangement is preferably such that the application of pulse 50 to only one of conductors 23 or 26 results in the appearance of a potential across switch 38 insufficient to cause it to break down.

When the discharge time constant in the circuit of FIG. 5 is greater than one frame interval in the context of a complete display panel, rapid discharge, so as to be ready for addressing during the next frame, may be obtained by arranging the addressing source so as to deliver a reverse-polarity potential prior to the re-addressing of the display element. Because switch 38 is bi-directional, the reverse-polarity potential fires the switch so that both display element 31 and accumulation element 34 are discharged to a potential which is close to zero. This requires that the switch pass current in both forward (for charging) and reverse (for discharging) directions.

Returning now to the addressing of a complete display panel of the kind represented by FIGS. 1 and 4, the sequence of operation is first to fire individual switches 38 in a selected row, successively or simultaneously, so as to store upon the accumulation elements in that row respective energy levels related to corresponding instantaneous levels of the picture information. After the storage has been completed for that row, all of switches 38 therein are turned off and the row conductors are turned to ground. Consequently, all display elements in the row are simultaneously actuated to exhibit light of an intensity corresponding to the stored picture information.

Figure 7:
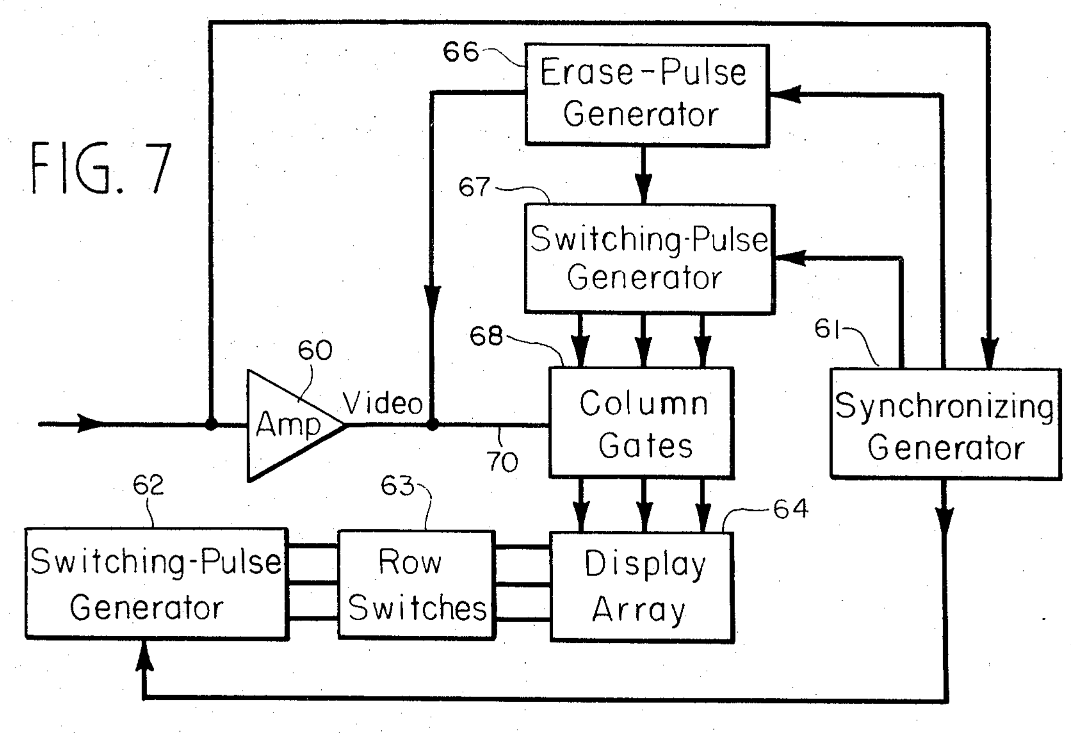
FIG. 7 is a block diagram of an addressing system used in connection with image-display panels including the elements and circuitry depicted in the preceding figures.

FIG. 7 shows a system suitable for addressing a display panel embodying display elements as diagrammed in FIG. 5, and of a type responsive to a unidirectional control potential. An amplifier 60 supplies a video signal composed of successive intervals of time-domain picture information. A synchronizing generator 61 supplies synchronizing information in the form of row- and column-selection signals timed by the synchronizing components of the composite video signal supplied to amplifier 60. The row-selection signals from generator 61 synchronize the action of a switching-pulse generator 62 that actuates a plurality of row switches 63 in order to selectively address the individual rows of display elements of a display array 64 such as that shown and described in connection with FIG. 5. Switches 63 complete respective return circuits to a source of potential within switching-pulse generator 62 that complements the firing and control pulses that are applied by the column-addressing portion of the system. Subsequent to the application of control pulses, row swtiches 63 also connect the respective row conductors to ground so that the accumulation elements discharge their stored energy into the associated display elements.

Column-selection signals from generator 61 are applied both to an erase-pulse generator 66 and to a switching-pulse generator 67. Switching-pulse generator 67 creates a sequence of firing pulses that are sequentially addressed to a plurality of column gates 68 which connect to corresponding vertical columns in array 64. Erase-pulse generator 66 feeds reset signals to generator 67 in order to return it to a ready condition after the scanning of each complete row, and generator 66 also delivers erase pulses through column gates 68 to the switches associated with each of the light-display elements in array 64.

Figure 8:
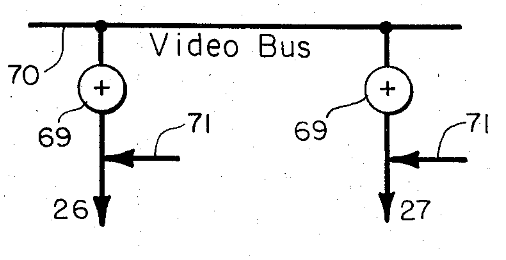
FIG. 8 is a fragmentary schematic diagram of a portion of the circuitry included in FIG. 7.

Column gates 68 may comprise a plurality of ovonic threshold switches 69 selectively caused to be connected between a video bus 70 from amplifier 60 and the respective different vertical conductors as schematically indicated in FIG. 8. Switching-pulse generator 67 may be a conventional shift register which steps its output firing pulses from each successive column gate terminal 71 to the next. During the time interval that each switch 69 is rendered conductive, the video signal from amplifier 60 is fed through that switch to the corresponding switch 38 and accumulation element 34 within the selected column. The column-selection signals from generator 61 synchronize the action of switching-pulse generator 67 to the delivery of the video information, while the signal fed from erase-pulse generator 66 insures a complete timing lock between the row scanning intervals and the erasing operation. The erase pulses themselves take the form of the reverse-polarity pulses discussed above that, when applied through gates 68, serve to remove all energizing charge from the display elements as well as from the associated accumulation elements.

Switching-pulse generator 62 similarly may be a shift register which develops a series of output pulses that are fed respectively from one row switch to the next. Upon completion of the addressing of a given row through column gates 68, switching pulse generator 62 applies another pulse to the associated row switch 63, the latter being of a double-throw character, so as then to connect the row to ground. In overall operation, then, erase-pulse generator 66 first functions to erase all storage from a row of the accumulation elements and also from the display elements. Switching-pulse generators 62 and 67 then enable sequential actuation of gates 68 so that switches 38 within the panel are rendered conductive and the video information is written sequentially into the accumulation elements within the selected row. Finally, the process is shifted by action of generator 62 to begin writing the video information into the next row, while, at the same time, all elements of the previously addressed row are simultaneously return to ground so that light display may begin.

Other types of display elements require excitation by an alternating-current waveform in order to produce or control light. Examples of such devices are electroluminescent phosphors and particle light modulators. For such elements, the fundamental control circuit of FIG. 5 can still be used, but it cannot be effectively operated in the same way. If the AC actuating potential is applied between row and column conductors, most of the current flowing through breakdown switch 38 will flow through storage capacitor 34, where it will do no useful work in producing light output. This is also true if the row electrode 23 is connected to ground and the AC is applied to column electrode 26. If row electrode 23 is driven with AC and column electrode 26 is allowed to float or is connected to ground, there will be no selection or control, since elements 31 and 34 are assumed sufficiently linear that the current flowing through them is substantially independent of any charge stored on them, but is a function of the potential across their terminals.

If column electrode 26 is driven with AC and row electrode 23 is allowed to float, that is, it is connected to a high impedance, then the firing of any breakdown switch 38 connected to that row electrode (through its storage element 34) will result in the row electrode being held at the potential of the driven column electrode, due to the low impedance of storage element 34 and the fired breakdown switch 38. As a result, no other display element connected to the row electrode will fire.

These difficulties can be surmounted by a different method of operation, in accordance with the present invention. The first step is to store charges in display element 31 and accumulation element 34 related to the amount of light to be produced by the display element. The waveform sequence of FIG. 6, described earlier, is used, with typically the selected row electrode being driven in one polarity, e.g., positive with respect to ground, while the selected column electrodes are driven in the opposite polarity. Usually all the elements in a row are addressed simultaneously, although there may be applications in which individual elements are addressed and given control charges one at a time.

Figure 10:
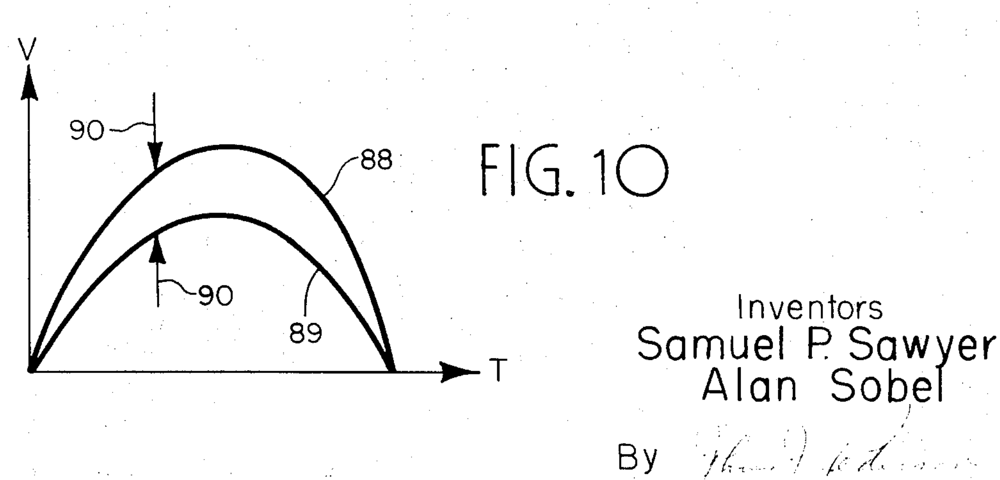
FIG. 10 is a plot of a potential waveform useful in addressing a light-display element in a system such as that shown in FIG. 9.

Next, a sustaining potential is applied. A sustain potential which first increases and then decreases is applied between the column electrodes, e.g., 26, and ground. A sustain potential of the same general shape but of lower amplitude is applied between the row electrodes, e.g., 23, and ground. The row sustain potential is in phase with the column sustain potential, so both would be zero at the same time. This is shown in FIG. 10, with curve 88 representing the column-electrode sustain potential and curve 89 the row-electrode sustain potential. The varying component of the sustain potential across the breakdown switch 38 at the cross-point is approximtely equal to the difference between these two applied potentials. (This is not precisely true, since accumulation element 34 and display element 31 constitute a potential divider between electrode 23 and ground, applying only a portion of the potential at 23 to the terminal of switch 38 that is connected to elements 31 and 34. However, the impedance of element 34 is much less than that of element 31, so that substantially all of the potential on electrode 23 will appear at the junction of elements 31, 34 and 38. Hence the difference between curves 88 and 89 of FIG. 10 is essentially the alternating component of the potential across breakdown switch 38.) This is superimposed on the fixed potential due to the charge on capacitors 34 and 31, placed there by the sequence of firing and control potential described in connection with FIG. 6. This fixed potential will have the effect of separating curves 88 and 89 of FIG. 10, so that they do not reach zero at quite the same time.

As the sustain potentials increase, the difference between them, added to the fixed potential on the capacitors, will eventually exceed the breakdown voltage of switch 38. Switch 38 thereupon conducts. This brings the junction of elements 31, 34 and 38 to the potential of column electrode 26, less the conducting voltage $V_c$ (FIG. 3) of the breakdown switch. Current now flows from the column electrode 26 through switch 38 and display element 31 to ground. Current also flows from electrode 26 through switch 38 and accumulation element 34 to electrode 23. Although the impedance of this circuit is lower than that of the circuit incorporating display element 31, the voltage across it is also lower, since the potential on electrode 23 is in phase with the potential on element 26. As a result, more current flows through display element 31, where it is useful, than through accumulation element 34.

As a result of the current flow through capacitors 31 and 34, the potentials across them change. Because of this and because of the change with time of the potentials on electrodes 26 and 23, the potential across the breakdown switch eventually falls to less than the minimum required to sustain conduction. As a consequence, the switch turns off.

A result of this current flow is to change the stored potential on capacitors 34 and 31. As a consequence, on the next cycle of actuating potential, which is preferably of the same polarity as in FIG. 10 but may be of the opposite polarity, conduction through the switch will start at a different time. Eventually there will be insufficient potential in the capacitors due to their stored charge to cause the switch to break down at any point in the cycle. For the rest of the time that actuating potential is applied, the only current through display element 31 will be that due to the potential on electrode 23, which will produce much less output than when combined with the potential on element 26. Accordingly, this arrangement provides for applying unidirectional control potentials and pulsating or AC actuating potentials, with the control potential stored in a larger capacitance than is available in the capacitance of the display element alone.

Figure 11:
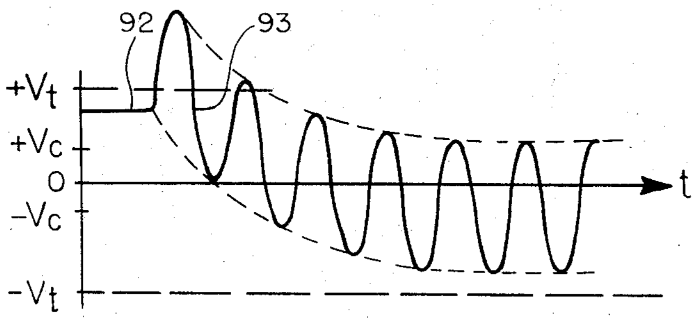
FIG. 11 is a plot of an alternating potential waveform useful in addressing and actuating a light-display element in a modified form of the system of FIG. 9.

The length of time the alternating-current energization of the display elements in the selected row continues is a function of the storage level previously placed in the respective accumulation elements 34. With reference to FIG. 11, the different voltage levels indicated along the ordinate axis correspond to the threshold voltags and cut-off voltages of switches 38. The initial level portion 92 of the illustrated curve represents the storage level, between $V_c$ and $V_t$, to which an accumulation element has been charged during the initial operation to write in the video signals. The reamining and alternating portion 93 of the waveform represents the potential difference across switch 38 with subsequent passage of time, thus representing the difference between curves 88 and 89 of FIG. 10 and their logical continuations.

Accordindly, on the first cycle of the applied net alternating voltage, the threshold potential $V_t$ of a switch 38 is exceeded to establish conduction which continues, as the initially created direct-current component of the charge decays, until a negative swing of the alternating potential has a peak below the cutoff voltage $V_c$ and the immediately following positive peak of the alternating waveform no longer exceeds the threshold voltage $V_t$. Of course, the peak-to-peak alternating supply voltage must be less than the threshold voltage $V_t$ so that, in the absence of unidirectional storage upon the associated accumulation element, the switch does not fire. The number of cycles of the alternating current delivered to the light-display element is a function of the initial firing pulse amplitude, the amplitude and frequency of the alternating current, and the relative values of the capacitors involved. With the illustrative signal represented in FIG. 11, energization of the display elements begins with the appearance of the first positive peak and continues until the appearance of the second negative peak. By decreasing the frequency of the applied potential, which increases the effective discharge time constant, the duration of light production or control, or the persistence, may be increased. The "on-time" indeed may be of substantial portion of a frame interval. The AC actuating system and its mode of operation to achieve modulation of the light output are further described and claimed in the copending application of Alan Sobel, Ser. No. 135,954, now U.S. Pat. No. 3,714,374, filed Apr. 21, 1971, for "Image-Display Panel With Breakdown Switch Addressing," and assigned to the present assignee.

Although FIG. 5 shows element 31 comprising a resistance and a capacitance, it is an advantage of this circuit arrangement that the display element need have no capacitance associated with it, since all the information and energy storage can be effected by capacitor 34.

Figure 9:
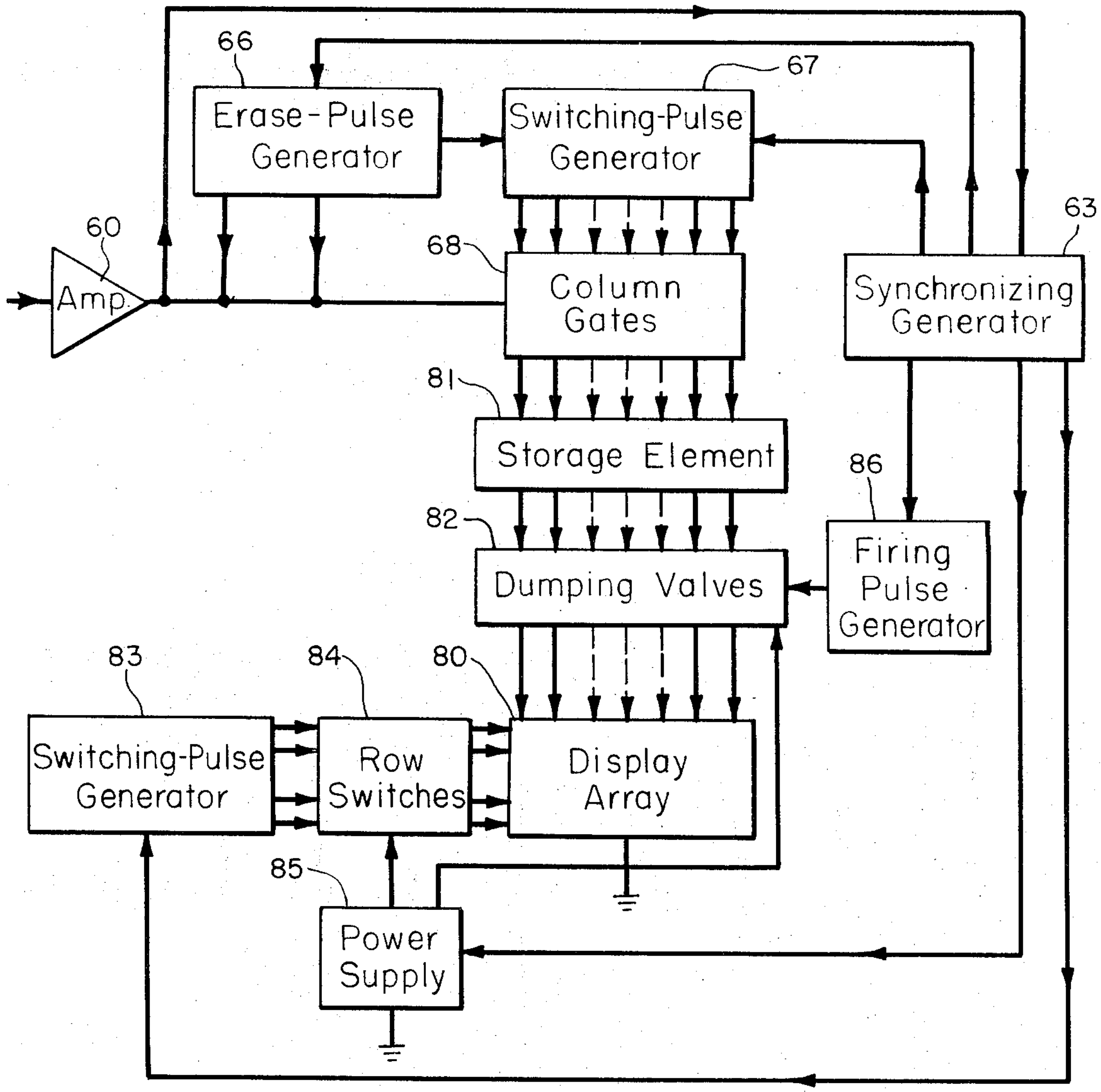
FIG. 9 is a block diagram of an addressing system which alternatively may be used in image-display panels including elements and circuitry depicted in the preceding figures.

FIG. 9 shows a representative system for operating a display array 80 of AC-responsive elements connected as in FIG. 5 in the manner just described. Video information from a signal source is delivered to a video bus from an amplifier, 60. Synchronizing information from the same source, transmitted over the same or a different wire, is delivered to synchronizing generator 63. Synchronizing generator 63 activates switching-pulse generator 67 to cause it to open column gates 68, one at a time, in sequence. As a result, pieces of video information, each corresponding to the light level to be produced from one picture element in a row of picture elements, is fed to one of storage elements 81 and stored there. When all of the storage elements are filled, they contain all the information for one line or row of the picture.

The synchronizing generator now causes dumping valves 82 to open, discharging their contents into elements of display array 80. At the same time, switching-pulse generator 83 activates one of row switches 84. The joint operation of dumping valves 82 and row switches 84 selects one row of elements in display array 80 to be operated upon. The waveform applied to these elements is like that of FIG. 6; the initial firing pulse 50 is supplied by switching-pulse generator 83 for the rows and firing-pulse generator 86 for the columns. The modulation or control portion of the pulse 51 is supplied by the contents of the dumping valves and by a fixed-amplitude pulse from switching-pulse generator 83. As a result, only the elements in the desired row are affected. All other elements have voltages from the dumping valves applied which are insufficient to cause breakdown switches 38 to fire.

With the contents of the storage elements transferred to the display elements, row switches 84 and dumping valves 82 are actuated to connect the row and column electrodes of display array 80 to AC supply generator 85. As described earlier, the amplitude of the AC potential fed to the row electrode via row switches 84 is lower than that fed to the column electrodes via dumping valves 82. Operation of the display elements, like those described in connection with FIG. 5, now proceeds in the manner already described. Synchronizing generator 63 now activates erase-pulse generator 66 to reset switching-pulse generator 67 so that it is ready to start sequencing a new line of information into the storage elements, and also resets all the storage elements so that they are all restored to the same initial states, ready to receive the new information corresponding to the next line of video. Video information is next distributed, element by element, to the appropriate storage elements 81, while power supply 85 activates all the elements of array 80 which have sufficient stored charge. At the end of this line of information, the next row switch 84 is operated (or the second next row switch if the display is interlaced) and the process proceeds as described above.

Thus far, there have been described techniques each involving at each picture-element position in a matrix one display element, one active switch, and one capacitor. Operation may be permitted with either direct current or alternating current, although the former is somewhat simpler in terms of the addressing requirements. The systems described address the rows one at a time both for writing in the video information and for erasing. For alternating current excitation in particular, the excitation is best applied while the write-in phase is not functioning. For conventional television standards, this suggests writing the video information during retrace time and applying the AC excitation during trace time.

Figure 12:
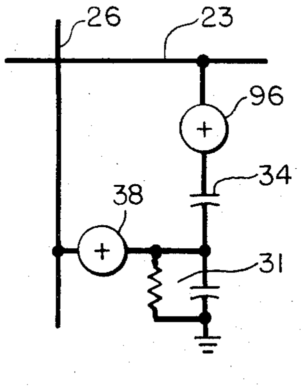
FIG. 12 is a schematic diagram of an alternative display element and associated component arrangement.

A modified elemental circuit combination is shown in FIG. 12. In this case, the arrangement is the same as in FIG. 5 except for the inclusion of an additional threshold switch 96 in series with accumulation element 34 between row electrode 28 and display element 31. As betseen themselves, accumulation element 34 and switch 96 may be connected in either sequence between row electrode 23 and display element 31.

In operation of FIG. 12, unidirectional firing and control pulses are applied as before between row electrode 23 and column electrode 26 for the purpose of storing the video-representative energy in accumulation element 34 and display element 31. As utilized in the system of FIG. 9, this function is performed in the same manner as already described except to note that the firing pulses serve to render both switches 38 and 96 conductive. In the complete array, then, a given row is selected and the firing and control pulses are applied to the individual columns so as to impress the respective instantaneous video levels upon the accumulation elements in the selected row.

During the subsequent display interval, alternating current is simply applied between all the row electrodes and the plane of reference potential or ground. Once switched to that mode, the operation again is as described in connection with FIG. 11 except that in this case curve 93 represents the single applied waveform.

Thus, in operation of FIG. 12, video-representative charge is first stored in the respective accumulation elements of a given row with both switches 38 and 96 being conductive during this portion of the overall addressing cycle. During the subsequent display portion of the operation, switch 38 remains non-conductive. The alternating-current flow continues until, again as illustrated in FIG. 11, the decay of the original unidirectional charge is such tha switch 96 again becomes non-conductive. While a matrix constructed of display elements arranged as in FIG. 12 is complicated slightly by the necessity of including an additional breakdown-type switch at each picture element position, at the same time the alternating-current addressing portion of the peripheral circuitry is correspondingly simplified and performance, such as the ratio at maximum to minimum light output, is improved.

While the ovonic switches described are particularly attractive because of their minute size and their applicability to complete solid-state fabrication, other known breakdown-type switches may be substituted. For example, small gas plasma cells exhibit firing characteristics very much like the ovonic switches and thus may be utilized instead.

As specifically discussed herein, the light-display elements have been returned to a fixed potential level (e.g., ground) and the different firing, writing and excitation energy applied to the row and column electrodes. However, if desired, the column electrodes may instead be held at the fixed level and the common ground terminal and the row electrodes be driven with appropriate potentials. This can result in a simplification of the peripheral circuitry.

The several systems described take advantage of the attributes of simple threshold switches in order accurately and efficiently to control the addressing and energization of the light-display elements within an image reproducing panel. Consequently, the structures are such that they are admirably compatible with the use of present-day solid-state technology in the fabrication of the entire panel. At each image-display element within the panel, at least one simple switch serves to establish selection of its associated light-display element and accumulation element while at the same time serving as part of the control for subsequent energization of the light-display element. All of the different systems described permit the employment of a large variety of different kinds of light-display elements.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

We claim:

1. An image-display panel comprising:
- a plurality of image-display elements distributed in a matrix of rows and columns, each of said elements displaying light in proportion to its level of energization;
- means for returning all of said display elements to a plane of reference potential;
- means for supplying a video signal and row- and column selection signals, including row and column conductors;
- a plurality of capacitive energy-accumulation elements, each serially coupled to its corresponding image-display element;
- a plurality of breakdown-type switches each serially coupled between its corresponding column conductor and the junction between said corresponding capacitive energy-accumulation element and image-display element;
- conditioning means responsive to said column-selection signals and said video signals for selectively addressing the columns of said accumulation elements and switches to store in said accumulation elements respective instantaneous levels of said video signal; and
- actuating means responsive to said row-selection signals for selectively addressing the rows of said accumulation elements and switches so that the instantaneous levels of the video signal for each column are stored in elements of a selected row and no other, said actuating means also subsequently coupling one terminal of said capacitive accumulation elements to the plane of reference potential for causing said accumulation elements to discharge through said image-display elements.

2. A display panel as defined in claim 1, in which said actuating means drives a selected row in one polarity while said conditioning means drives a selected column in the opposite polarity to fire the switch at the intersection of the selected row and column.

3. A display panel as defined in claim 1, in which the accumulation elements in a selected row are addressed sequentially with said video signal and said actuating means effects delivery of said storage simultaneously to all the display elements in that row.

4. A display panel as defined in claim 1, in which said display elements each exhibit capacitance the value of which is substantially less than that of the respectively associated accumulation element.

5. An image-display panel as defined in claim 1, in which said accumulation elements are charged in response to conduction of said switches and, in response to the completion of such charging, said actuation means returns the corresponding ones of said switches to said plane of reference potential.

6. A display panel as defined in claim 1, which further includes means for discharging said accumulation elements and said display elements prior to delivery of said storage to said display elements.

7. A display panel as defined in claim 1, in which said conditioning means addresses said columns with switch-firing pulses supplemented with control pulses of an amplitude proportional to the instantaneous level of said video signal.

8. A display panel as defined in claim 7, in which said actuating means addresses said rows with pulses that complement said firing pulses to permit discharge of said control pulses through said display elements.

9. A display panel as defined in claim 1, in which a second breakdown-type switch is serially coupled between said capacitive accumulation element and said corresponding row conductor.

10. A display panel as defined in claim 1, in which said conditioning means addresses said columns with control pulses that exhibit a characteristic proportional to the instantaneous amplitude of said video signal, and in which said actuating means and said conditioning means, upon completion of said storage, respectively address said rows and columns with sustain pulses which are in phase but of unequal amplitude, the difference in said amplitude being sufficient to cause controlled conduction of said breakdown-type switches.

11. A display panel as defined in claim 10, in which said actuating means returns said rows to said plane of reference potential upon completion of a predetermined cycle of said alternating pulses.

12. A display panel as defined in claim 1, in which a second breakdown-type switch is included in series with each accumulation element between the corresponding row and display element, and said actuating means applies an alternating potential between said rows and between said plane of reference potential subsequent to delivery of said storage to said display elements.

* * * * *

UNITED STATES PATENT OFFICE

CERTIFICATE OF CORRECTION

Patent No. 3,765,011 Dated October 9, 1973

Inventor(s) Samuel P. Sawyer & Alan Sobel

It is certified that error appears in the above-identified patent and that said Letters Patent are hereby corrected as shown below:

column 6, line 58, delete "Vhd t." and substitute --$V_t$.--

Signed and sealed this 16th day of July 1974.

(SEAL)
Attest:

McCOY M. GIBSON, JR.
Attesting Officer

C. MARSHALL DANN
Commissioner of Patents